United States Patent [19]
Hosoya et al.

[11] Patent Number: 5,743,132
[45] Date of Patent: Apr. 28, 1998

[54] THROTTLE VALVE SWITCH UNIT

[75] Inventors: Hajime Hosoya, Takasaki; Satoru Watanabe, Maebashi, both of Japan

[73] Assignee: Unisia Jecs Corporation, Atsugi, Japan

[21] Appl. No.: 855,511

[22] Filed: May 13, 1997

Related U.S. Application Data

[63] Continuation of Ser. No. 606,801, Feb. 26, 1996, abandoned.

[30] Foreign Application Priority Data

Feb. 28, 1995 [JP] Japan ................... 7-064738

[51] Int. Cl.$^6$ ................... G01M 15/00
[52] U.S. Cl. ................... 73/118.2; 73/116; 73/118.1; 123/478
[58] Field of Search ................... 73/116, 117.2, 73/117.3, 118.1, 118.2; 123/478; 364/431.051, 431.052

[56] References Cited

U.S. PATENT DOCUMENTS

| | | | |
|---|---|---|---|
| 4,561,295 | 12/1985 | Kamai | 73/117.3 |
| 4,653,453 | 3/1987 | Kamai et al. | 73/117.3 |
| 4,679,440 | 7/1987 | Okamura | 73/118.1 |
| 4,715,220 | 12/1987 | Eitoku et al. | 73/118.1 |
| 4,719,795 | 1/1988 | Eitoku et al. | 73/118.1 |
| 5,070,728 | 12/1991 | Kubota et al. | 73/118.1 |
| 5,321,980 | 6/1994 | Hering et al. | 73/118.1 |

*Primary Examiner*—George M. Dombroske
*Attorney, Agent, or Firm*—Foley & Lardner

[57] ABSTRACT

A throttle valve switch unit for use with a throttle valve situated in an internal combustion engine. A mobile contact is drivingly connected to the throttle valve for movement with rotation of the throttle valve. The mobile contact is engageable with at least two fixed contacts. The first fixed contact is placed for engagement with the mobile contact when the throttle valve occupies a first predetermined position. The second fixed contact is placed for engagement with the mobile contact when the throttle valve occupies a second predetermined position. The first fixed contact is connected through a first resistance element to one of a first terminal for connection to the ground and a second terminal for connection with a source, of voltage. The second fixed contact is connected to the one terminal through a second resistance element having a resistance value different from that of the first resistance element. The mobile contact is connected to the other terminal through a third resistance element. The mobile contact is connected to a single signal terminal for producing signals having voltage levels different when the throttle valve occupies the first predetermined position than when the throttle valve occupies the second predetermined position.

20 Claims, 8 Drawing Sheets

THROTTLE VALVE SWITCH UNIT

This application is a continuation of application Ser. No. 08/606,801, filed Feb. 26, 1996, now abandoned.

BACKGROUND OF THE INVENTION

This invention relates to a throttle valve switch unit for use with a throttle valve situated in an internal combustion engine to determine which one of a plurality of predetermined positions the throttle valve occupies.

It is the current practice to determine which one of a plurality of predetermined positions the throttle valve occupies with the use of a throttle switch having a plurality of fixed contacts provided at positions corresponding to the predetermined throttle valve positions. However, such a conventional throttle switch requires a plurality of signal terminals related to the number of the fixed contacts, resulting in a space consuming throttle switch.

SUMMARY OF THE INVENTION

It is a main object of the invention is to provide a compact and inexpensive throttle valve switch unit which permits determination of which one of a plurality of predetermined positions the throttle valve occupies based on a signal fed from a single terminal.

There is provided, in accordance with the invention, a throttle valve switch unit for use with a throttle valve situated in an internal combustion engine. The throttle valve switch unit comprises a mobile contact drivingly connected to the throttle valve for movement with rotation of the throttle valve, at least first and second fixed contacts, the first fixed contact being provided for engagement with the mobile contact when the throttle valve occupies a first predetermined position, the second fixed contact being provided for engagement with the mobile contact when the throttle valve occupies a second predetermined position, a first terminal for connection to a ground, a second terminal for connection to a source of voltage, a first resistance element connected between the first fixed contact and one of the first and second terminals, the first resistance element having a first predetermined resistance value, a second resistance element connected between the second fixed contact and the one terminal, the second resistance element having a second predetermined resistance value different from the first predetermined resistance value, a third resistance element connected between the mobile contact and the other terminal, and a single signal terminal connected to the mobile contact for producing signals having voltage levels different when the throttle valve occupies the first predetermined position than when the throttle valve occupies the second predetermined position.

In another aspect of the invention, the throttle valve switch unit comprises a mobile contact drivingly connected to the throttle valve for movement with rotation of the throttle valve, at least first and second fixed contacts, the first fixed contact being provided for engagement with the mobile contact when the throttle valve occupies a first predetermined position, the second fixed contact being provided for engagement with the mobile contact when the throttle valve occupies a second predetermined position, an elongated contact provided for engagement with the mobile contact throughout an entire range of rotation of the throttle valve, a first terminal for connection to a ground, a second terminal for connection to a source of voltage, a first resistance element connected between the first fixed contact and one of the first and second terminals, the first resistance element having a first predetermined resistance value, a second resistance element connected between the second fixed contact and the one terminal, the second resistance element having a second predetermined resistance value different from the first predetermined resistance value, a third resistance element connected between the elongated contact and the other terminal, and a single signal terminal connected to the elongated contact for producing signals having voltage levels different when the throttle valve occupies the first predetermined position than when the throttle valve occupies the second predetermined position.

In another aspect of the invention, the throttle valve switch unit comprises a mobile contact drivingly connected to the throttle valve for movement with rotation of the throttle valve, at least first and second fixed contacts, the first fixed contact being provided for engagement with the mobile contact when the throttle valve occupies a first predetermined position, the second fixed contact being provided for engagement with the mobile contact when the throttle valve occupies a second predetermined position, a first terminal for connection to a ground, a second terminal for connection to a source of voltage, first and second resistance elements connected with the first and second fixed contacts to form a series circuit having the resistance elements and fixed contacts arranged alternatively, the series circuit being connected between the first and second terminals, and a single signal terminal connected to the mobile contact for producing signals having voltage levels different when the throttle valve occupies the first predetermined position than when the throttle valve occupies the second predetermined position.

In still another aspect of the invention, the throttle valve switch unit comprises a mobile contact drivingly connected to the throttle valve for movement with rotation of the throttle valve, at least first and second fixed contacts, the first fixed contact being provided for engagement with the mobile contact when the throttle valve occupies a first predetermined position, the second fixed contact being provided for engagement with the mobile contact when the throttle valve occupies a second predetermined position, an elongated contact provided for engagement with the mobile contact throughout an entire range of rotation of the throttle valve, a first terminal for connection to a ground, a second terminal for connection to a source of voltage, first and second resistance elements connected with the first and second fixed contacts to form a series circuit having the resistance elements and fixed contacts arranged alternatively, the series circuit being connected between the first and second terminals, and a single signal terminal connected to the elongated contact for producing signals having voltage levels different when the throttle valve occupies the first predetermined position than when the throttle valve occupies the second predetermined position.

BRIEF DESCRIPTION OF THE INVENTION

This invention will be described in greater detail by reference to the following description taken in connection with the accompanying drawings, in which like reference numerals identify like elements in the several figures and in which.

DETAILED DESCRIPTION OF THE INVENTION

Figure 1:
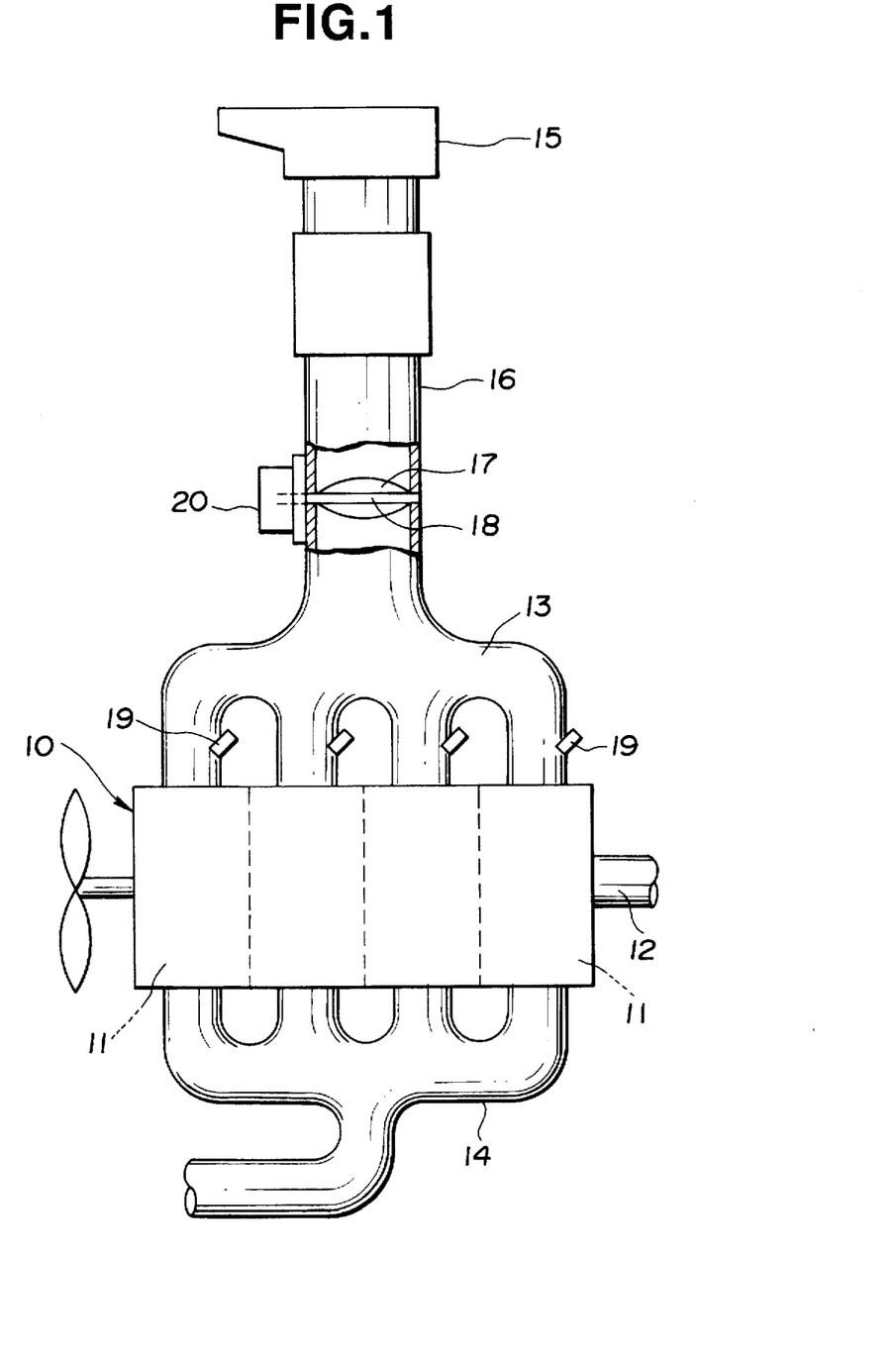
FIG. 1 is a schematic diagram showing an internal combustion engine to which one embodiment of a throttle valve switch unit of the invention is applicable.

With reference to the drawings, and in particular to FIG. 1, there is shown a schematic diagram of a throttle valve switch embodying the invention. An internal combustion engine, generally designated by the numeral 10, for an automotive vehicle includes a plurality of (in the illustrated case, four) combustion chambers or cylinders 11, each of which has a piston (not shown) mounted for reciprocal motion within the corresponding cylinder. A crankshaft 12 is supported for rotation within the engine 10 and it is drivingly connected to the pistons for rotation in response to reciprocation of the pistons within the cylinder 11. The cylinders 11 are connected with an intake manifold 13 for the entry of combustion ingredients into the cylinders 11 and also connected with an exhaust manifold 14 for the exit of combustion products, exhaust gases from the cylinders 11 into the exhaust manifold 14.

Air to the engine 10 is supplied through an air cleaner 15 into an induction passage 16. A butterfly throttle valve 17, mounted as for rotation on a throttle shaft 18, is situated within the induction passage 16 for controlling the amount of air permitted to enter the combustion chambers 11 through the intake manifold 13. The throttle valve 17 is connected by a mechanical linkage to an accelerator pedal. The degree of rotation of the throttle valve 17 is manually controlled by the operator of the vehicle. The numeral 19 designates fuel injectors 19 provided for the respective cylinders 11. Each of the fuel injectors 19 opens to inject fuel into the intake manifold 13 when it is energized on an electrical pulse signal fed thereto from a fuel injection control unit (not shown). The length of the electrical pulse, that is, the pulse-width, applied to the fuel injector 19 determines the length of time the fuel injector opens and, thus, determines the amount of fuel injected into the intake manifold 13.

In the operation of the engine 10, fuel is injected through, the fuel injector 19 toward the corresponding cylinder 11 and mixed with the air therein. Combustion of the air fuel mixture in the combustion cylinder 11 takes place, releasing heat energy, which is converted into mechanical energy.

Thereafter, the exhaust gases are discharged into the exhaust manifold 14. The amount of fuel metered to the engine, this being determined by the width of the electrical pulses applied to the fuel injectors 19, is calculated based on various conditions of the engine 10 that are sensed during its operation. For example, these sensed conditions includes cylinder-head coolant temperature, intake air flow, engine battery voltage and engine speed.

Figure 2:
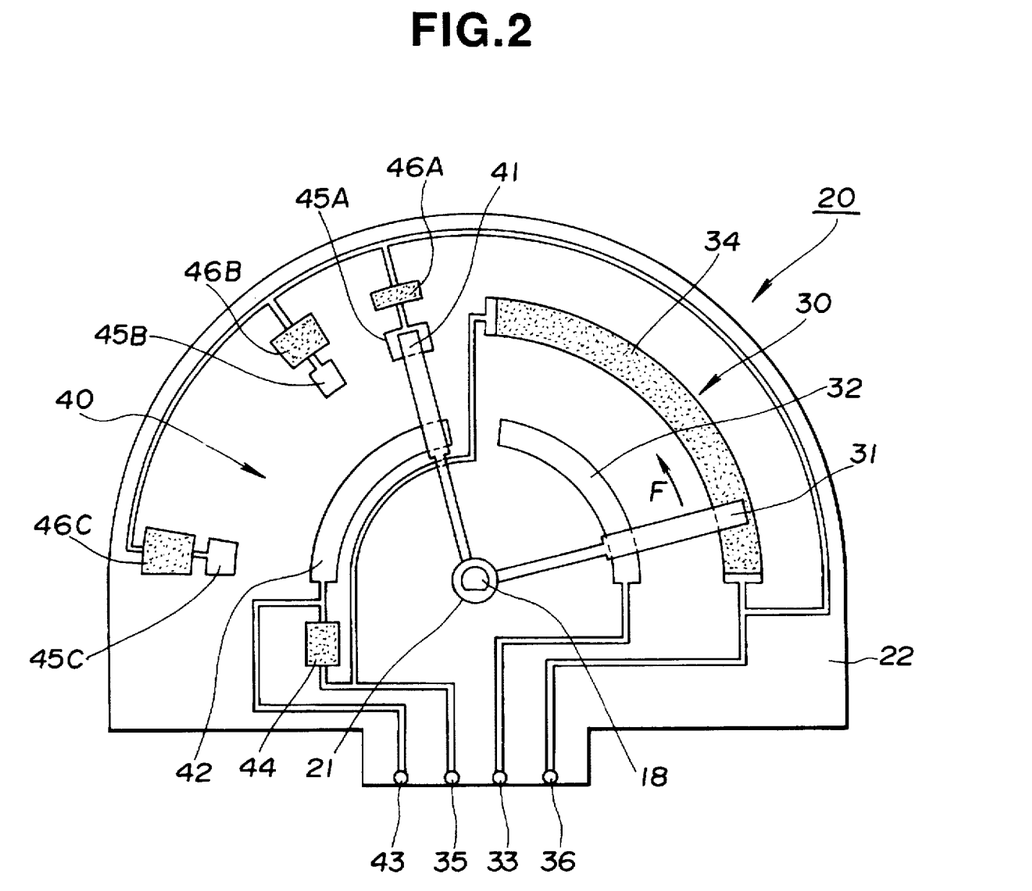
FIG. 2 is an enlarged plan view showing one embodiment of the throttle valve switch unit of the invention.
Figure 3:
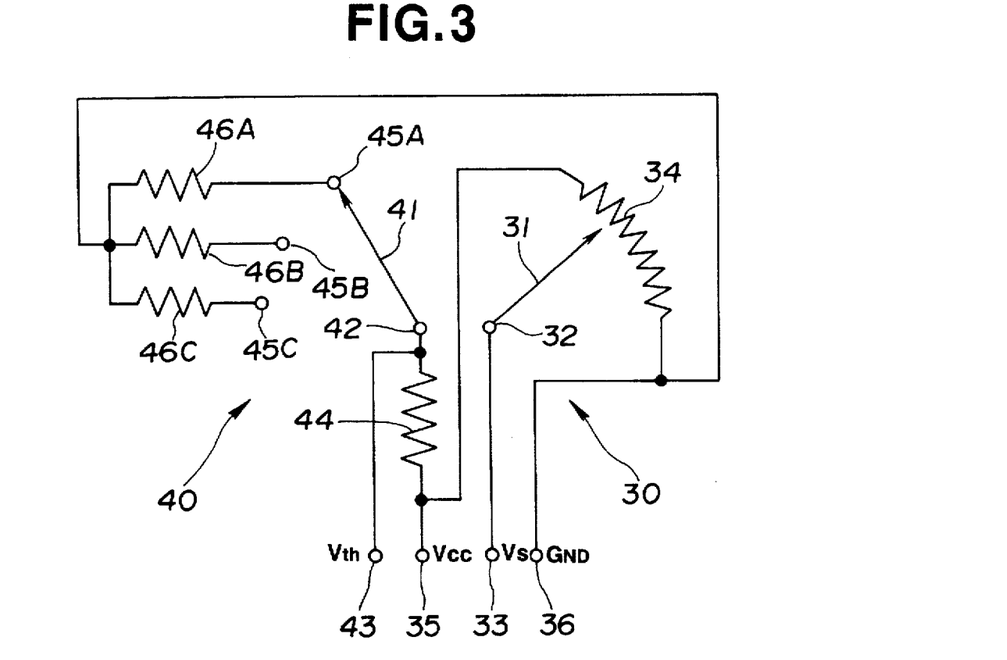
FIG. 3 is a circuit diagram showing an equivalent circuit of the combination of the throttle position sensor and throttle switch included in throttle valve switch unit of FIG. 1.

Referring to FIG. 2, there is shown a throttle valve switch unit embodying the invention. The throttle valve switch unit 20 is shown as having a throttle position sensor 30 and throttle switch 40 provided on a semi-circular shaped insulating substrate 22 made of a non-conductive material. A rotor 21 is suitably fixedly secured to the throttle shaft 18 and supported at the center of the substrate 22 for rotation in unison with the throttle shaft 18. The rotor 21 has two mobile contacts 31 and 41 taken in the form of wiper arms made of a conductive material. The mobile contacts 31 and 41 are formed to make an angle of about 90 degrees and rotated as a unit with rotation of the throttle shaft 18. The substrate 22 has a fixed contact 32 provided thereon. The fixed contact 32 is made of a conductive material and it is elongated arcuately so as to be engaged by the movable contact 31 throughout the entire range of movement of the mobile contact 31. The elongated contact 32 is connected to an output terminal 33. The substrate 22 also has a resistance element 34 provided thereon. The resistance element 34 extends arcuately outside of the fixed contact 32 so as to be engaged by the movable contact 31 throughout the entire range of movement of the mobile contact 31. For example, the resistance element 34 may be a resistive film printed and sintered on the substrate 22 to have a predetermined resistance. The resistance element 34 is connected at its one end to a terminal 35 for connection to a source of voltage (Vcc) and at the other end thereof to a terminal 36 for connection to the ground (GND) The mobile contact 31, the fixed contact 32 and the resistance element 34 constitute a potentiometer included in the throttle position sensor 30, as best shown in FIG. 3. The resistance of the potentiometer is a function of the extent to which the throttle valve 17 is open. The wiper arm 31 is operatively connected to the throttle valve 17 to change the resistance value of the potentiometer as the throttle valve 17 moves between its fully open and closed positions.

The substrate 22 also has a fixed contact 42 provided thereon. The fixed contact 42 is made of a conductive material and it is elongated arcuately so as to be engaged by the movable contact 41 throughout the entire range of movement of the mobile contact 41. The elongate contact 42 is connected to an output terminal 43 and also through a resistance element 44 to the terminal 35. For example, the resistance element 44 may be a resistive film printed and sintered on the substrate 22 to have a predetermined resistance R. A plurality of (in the illustrated case, three) fixed contacts 45A, 45B and 45C are provided on the substrate 22. The fixed contacts 45A, 45B and 45C are made of a conductive material and they are positioned in, an arcuate disposition outside of the fixed contact 42 so that the movable contact 41 can be engaged in succession with the fixed contacts 45A, 45B and 45C. The fixed contact 45A is positioned so as to be engaged, by the mobile contact 41 when the throttle valve 17 is at its closed or idle position. The fixed contact 45A is connected to the ground terminal 36 through a resistance element 46A. For example, the resistance element 46A may be a resistive film printed and sintered on the substrate 22 to have a predetermined resistance 0.5R. The fixed contact 45B is positioned so as to be engaged by the mobile contact 41 when the throttle valve 17 is at a correction position, that is, at an angle ranging from 10° to 20°. The correction position is used to detect and correct an error on the throttle position indicative signal fed from the throttle position sensor 30. The fixed contact 45B is connected to the ground terminal 36 through a resistance element 46B. For example, the resistance element 46B may be a resistive film printed and sintered on the substrate 22 to have a predetermined, resistance 2R. The fixed contact 45C is positioned so as to be engaged by the mobile contact 41 when the throttle valve 17 is at its full or wide open position. The fixed contact 45C is connected to the ground terminal 36 through a resistance element 46C. For example, the resistance element 46C may be a resistive film printed and sintered on the substrate 22 to have a predetermined resistance 100R. The mobile contact 41, the fixed contacts 42, 45A, 45B and 45C, and the resistance elements 44, 46A, 46B and 46C constitute the throttle switch 40. The combination of the resistance element 44 and one of the resistance elements 46A, 46B and 46C establish a voltage divider so that the output terminal 43 is established at a predetermined voltage level between the ground and the voltage supply, as best shown in FIG. 3. Since the resistance elements 46A, 46B and 46C have different resistance values, three different voltage levels appear at the output terminal 43 when the mobile contact 41 engages with the. respective fixed contacts 45A, 45B and 45C.

The operation is as follows: When the accelerator pedal is depressed to change the throttle valve 17 from its idle position toward its wide open position, the rotor 21 rotates from the position shown in FIG. 2 in the direction indicated by the arrow F. The throttle position sensor 30 produces a voltage V proportional to the angle θ at which the throttle valve 17 is open, as indicated by the line Vs of FIG. 4.

Figure 4:
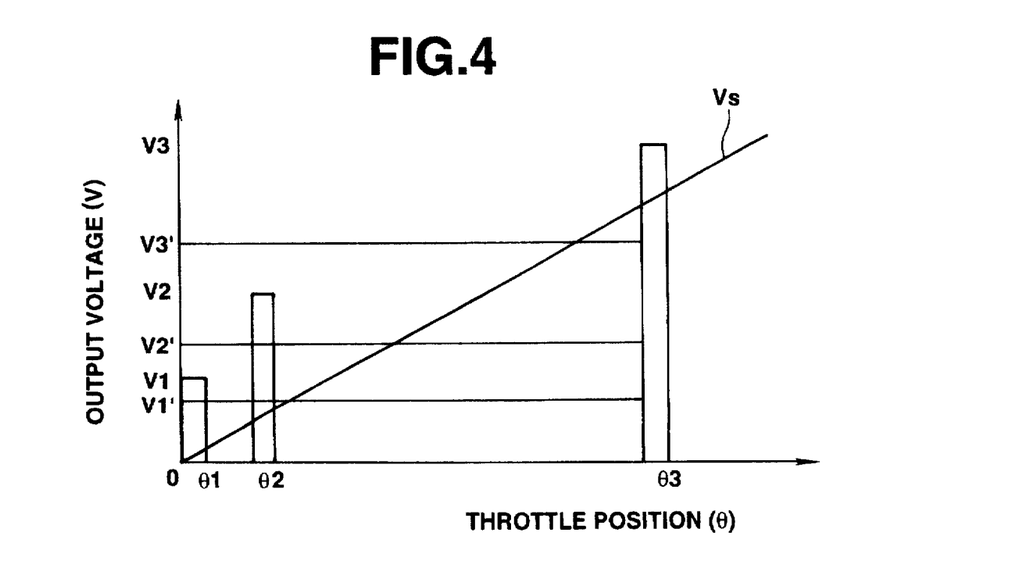
FIG. 4 is a graph used in explaining voltage signals produced at the output terminal of the throttle valve switch unit of FIG. 1.

When the throttle valve 17 is at the idle position θ1, the mobile contact 41 engages with the fixed. contact 45A, as shown in FIG. 2. As a result, the resistance element 46A is connected through the fixed contact 42 to the resistance element 44 to establish a voltage divider so that the output terminal 43 is established at an idle position indicative voltage level V1 between the ground and the voltage supply, as shown in FIG. 4. When the throttle valve 17 is at the correction position θ2, the mobile contact 41 engages with the fixed contact 45B. As a result, the resistance element 46B is connected through the fixed contact 42 to the resistance element 44 to establish a voltage divider so that the output terminal 43 is established at an correction position indicative voltage level V2 greater than the idle position indicative voltage level VI between the ground and the voltage supply, as shown in FIG. 4. When thee throttle valve 17 is at the wide open position θ3, the mobile contact 41 engages with the fixed contact 45C. As a result, the resistance element 46C is connected through the fixed contact 42 to the resistance element 44 to establish a voltage divider so that the output terminal 43 is established at a wide open position indicative voltage level V3 greater than the correction position indicative voltage level V2 between the ground and the voltage supply, as shown in FIG. 4. The output terminal 43 may be connected to a control unit which utilizes these indicative voltage levels V1, V2 and V3 for engine operation controls including fuel injection control.

Figure 5:
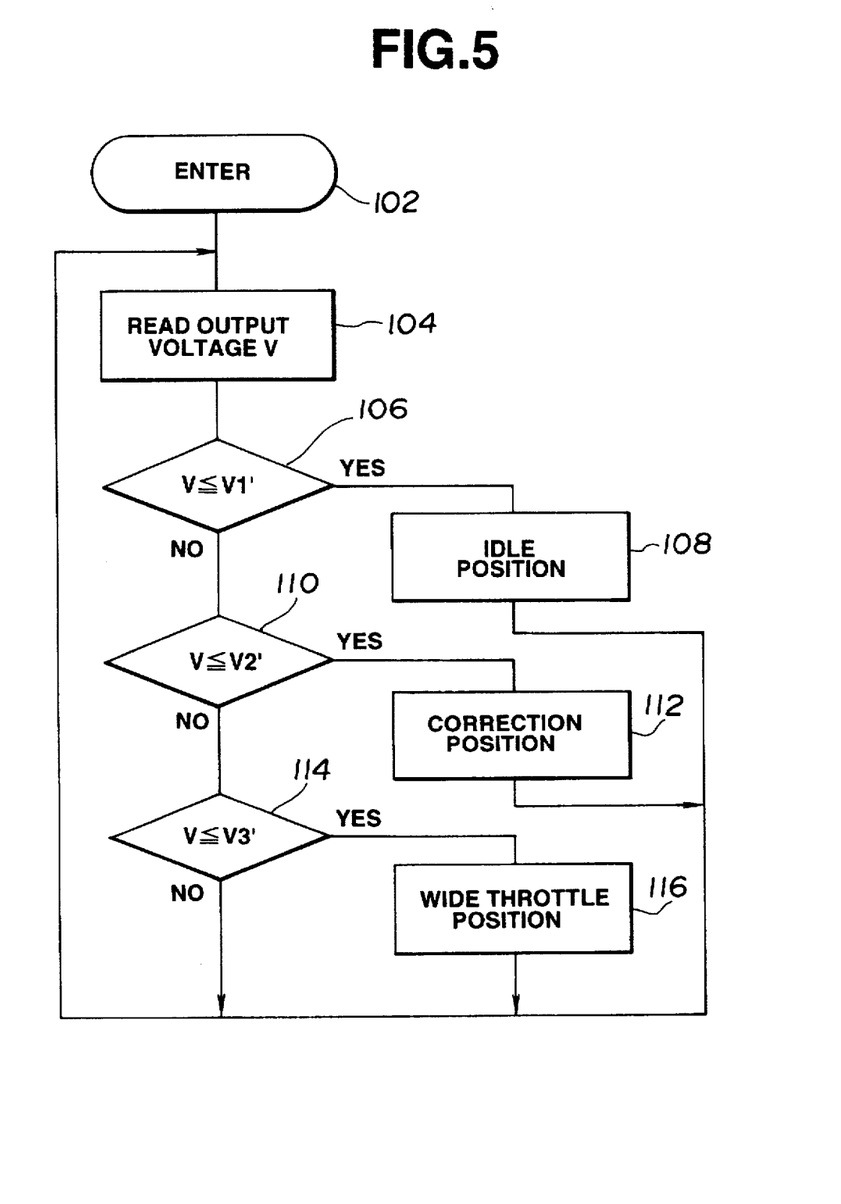
FIG. 5 is a flow diagram showing the programming of the digital computer as it is used to determine which one of a plurality of predetermined positions the throttle valve occupies.

FIG. 5 is a flow diagram illustrating the programming of the digital computer included in the control unit as it is used to judge the existing position of the throttle valve 17.

The computer program is entered at the point 102. At the point 104 in the program, the voltage level V at the output terminal 43 is read into the computer memory. At the point 106 in the program, a determination is made as to whether or not the read voltage level V is equal to or less than a first predetermined value V1'. The first predetermined value V1' is set at a value less than the voltage level V1, as shown in FIG. 4. If the answer to this question is "yes", then the program proceeds to the point 108 where it is judged that the throttle valve 17 is at the idle position. Following this, the program is returned to the point 104.

If the answer to the question inputted at the point 106 is "no", then the program proceeds to another determination step at the point 110. This determination is as to whether or not the read voltage level V is equal to or less than a second predetermined value V2'. The second predetermined value V1' is set at a value greater than the voltage level V1 and less than the voltage level V2, as shown in FIG. 4. If the answer to this question is "yes", then the program proceeds to the point 112 where it is judged that the throttle valve 17 is at the correction position. Following this, the program is returned to the point 104.

If the answer to the question inputted at the point 110 is "no", then the program proceeds to another determination step at the point 114. This determination is as to whether or not the read voltage level V is equal to or less than a third predetermined value V3'. The third predetermined value V3' is set at a value greater than the voltage level V2 and less than the voltage level V3, as shown in FIG. 4. If the answer to this question is "yes", then the program proceeds to the point 116 where it is judged that the throttle valve 17 is at the wide open position. Following this, the program is returned to the point 104. If the answer to the question inputted at the point 114 is "no", then the-program is returned to the point 104.

In this embodiment, different voltages V1, V2 and V3 appear at the output terminal 43 when the throttle. valve 17 occupies predetermined different positions. It is, therefore, possible to determine which one of the predetermined positions the throttle valve 17 occupies by monitoring the voltage produced at a single output terminal. This is effective to provide a compact and inexpensive throttle valve switch unit.

Figure 6:
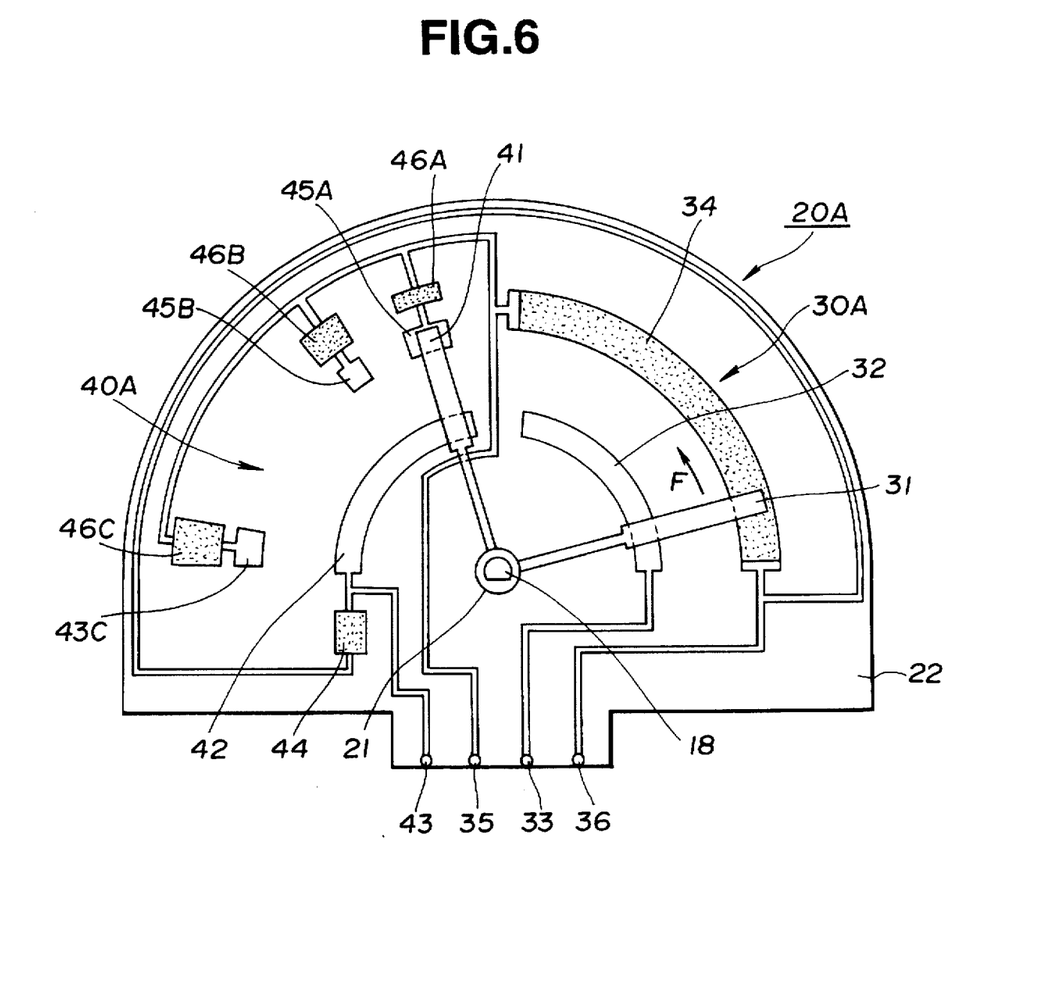
FIG. 6 is an enlarged plan view showing a modified form of the throttle valve switch unit of the invention.
Figure 7:
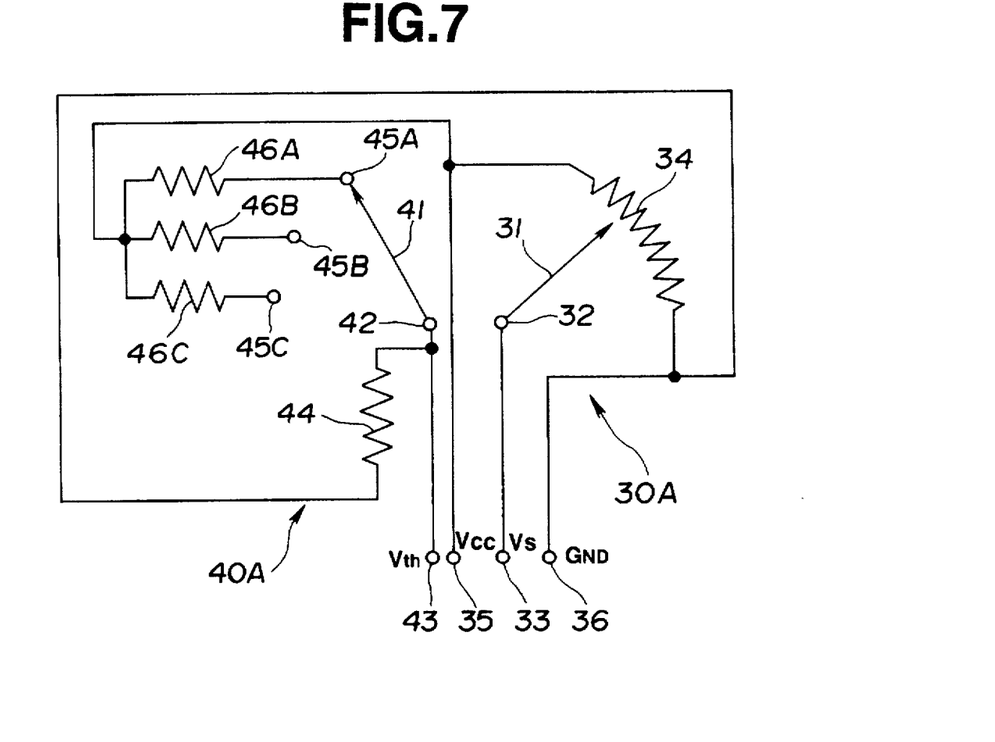
FIG. 7 is a circuit diagram showing an equivalent circuit of the combination of the throttle position sensor and throttle switch included in throttle valve switch unit of FIG. 6.

Referring to FIG. 6, there is shown a modified form of the throttle valve switch unit of the invention. In this modification, the throttle valve switch unit 20A is shown as having a throttle position sensor 30A and throttle switch 40A provided on a semi-circular shaped insulating substrate 22 made of a non-conductive material. A rotor 21 is suitably fixedly secured to the throttle shaft 18 and supported at the center of the substrate 22 for rotation in unison with the throttle shaft 18. The rotor 21 has two mobile contacts 31 and 41 taken in the form of wiper arms made of a conductive material. The mobile contacts 31 and 41 are formed to make an angle of about 90 degrees and rotated as a unit with rotation of the throttle shaft 18. The substrate 22 has a fixed contact 32 provided thereon. The fixed contact 32 is made of a conductive material and it extends arcuately so as to be engaged by the movable contact 31 throughout the entire range of movement of the mobile contact 31. The fixed contact 32 is connected to an output terminal 33. The substrate 22 also has a resistance element 34 provided thereon. The resistance element 34 extends arcuately outside of the fixed contact 32 so as to be engaged by the movable contact 31 throughout the entire range of movement of the mobile contact 31. For example, the resistance element 34 may be a resistive film printed and sintered on the substrate 22 to have a predetermined resistance. The resistance element 34 is connected at its one end to a terminal 35 for connection to a source of voltage (Vcc) and at the other end thereof to a terminal 36. For connection to the ground (GND). The mobile contact 31, the fixed contact 32, and the resistance element 34, constitute a potentiometer included in the throttle position sensor 30A, as best shown in FIG. 7. The resistance of the potentiometer is a function of the extent to which the throttle valve 17 is open. The wiper arm 31 is operatively connected to the throttle valve 17 to change the resistance value of the potentiometer as the throttle valve 17 moves between its fully open and closed positions.

The substrate 22 also has a fixed contact 42 provided thereon. The fixed contact 42 is made of a conductive material and it extends arcuately so as to be engaged by the movable contact 41 throughout the entire range of movement of the mobile contact 41. The fixed contact 42 is connected to an output terminal 43 and also through a resistance element 44 to the terminal 36. For example, the resistance element 44 may be a resistive film printed and sintered on the substrate 22 to have a predetermined resistance R. A plurality of (in the illustrated case three) fixed contacts 45A, 45B and 45C are provided on the substrate 22. The fixed contacts 45A, 45B and 45C are made of a conductive material and they are positioned in an arcuate disposition outside of the fixed contact 42 so that the movable contact 41 can be engaged in succession with the fixed contacts 45A, 45B and 45C. The fixed contact 45A is positioned so as to be engaged by the mobile contact 41 when the throttle valve 17 is at its closed idle position. The fixed contact 45A is connected to the terminal 35 through a resistance element 46A. For example, the resistance element 46A may be a resistive film printed and sintered on the substrate 22 to have a predetermined resistance 0.5R. The fixed contact 45B is positioned so as to be engaged by the mobile contact 41 when the throttle valve 17 is at a correction position, that is, at an angle ranging from 10° to 20°. The fixed-contact 45B is connected to the terminal 35 through a resistance element 46B. For example, the resistance element 46B may be a resistive film printed and sintered on the substrate 22 to have a predetermined resistance 2R. The fixed contact 45C is positioned so as to be engaged by the mobile contact 41 when the throttle valve 17 is at its full or wide open position. The fixed contact 45C is connected to the terminal 35 through a resistance element 46C. For example, the resistance element. 46C may be a resistive film printed and sintered on the substrate 22 to have a predetermined resistance 100R. The mobile contact 41, the fixed contacts 42, 45A, 45B and 45C, and the resistance elements 44, 46A, 46B and 46C constitute the throttle switch 40A. The combination of the resistance element 44 and one of the resistance elements 46A, 46B and 46C establish a voltage divider so that the output terminal 43 is established at a predetermined voltage level between the ground and the voltage supply, as best shown in FIG. 7. Since the resistance elements 46A, 46B and 46C have different resistance values, three different voltage levels appear at the output terminal 43 when the mobile contact 41 engages with the respective fixed contacts 45A, 45B and 45C.

Figure 8:
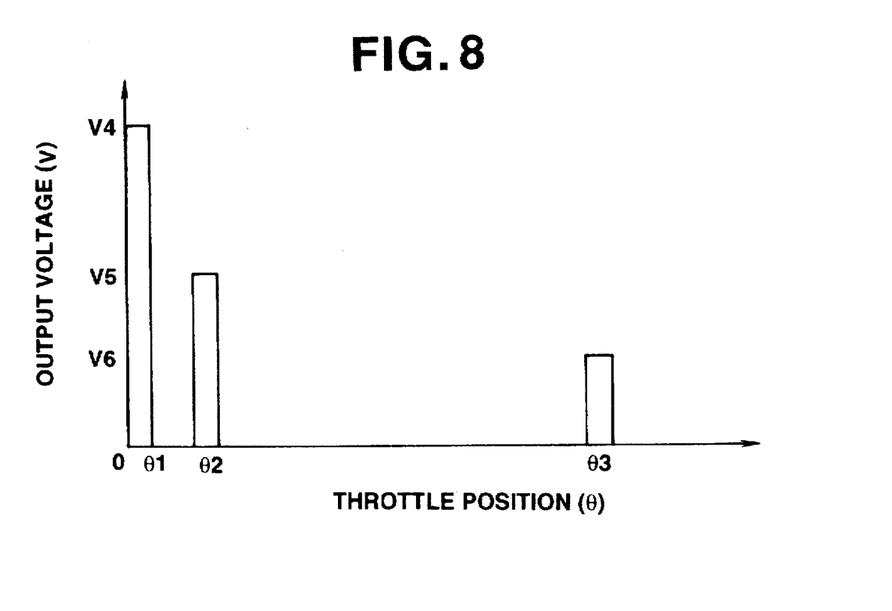
FIG. 8 is a graph used in explaining voltage signals, produced at the output terminal of the throttle valve switch unit of FIG. 6.

The operation of the modified form of the throttle switch 40A of the invention is as follows: When the accelerator pedal is depressed to change the throttle valve 17 from its idle position toward its wide open position, the rotor 21 rotates from the position shown in FIG. 6 in the direction indicated by the arrow F. When the throttle valve 17 is at the idle position θ1, the mobile contact 41 engages with the fixed contact 45A, as shown in FIG. 6. As a result, the resistance element 46A is connected through the fixed contact 42 to the resistance element 44 to establish a voltage divider so that the output terminal 43 is established at an idle position indicative voltage level V4 between the ground and the voltage supply, as shown in FIG. 8. When the throttle valve 17 is at the correction position θ2, the mobile contact 41 engages with the fixed contact 45B. As a result, the resistance element 46B is connected through the fixed contact 42 to the resistance element 44 to establish a voltage divider so that the output terminal 43 is established at an correction position indicative voltage level V5 less than the idle position indicative voltage level V4 between the ground and the voltage supply, as shown in FIG. 8. When the throttle valve 17 is at the wide open position θ3, the mobile contact 41 engages with the fixed contact 45C. As a result, the resistance element 46C is connected through the fixed contact 42 to the resistance element 44 to establish a voltage divider so that the output terminal 43 is established at a wide open position indicative voltage level V6 less than the correction position indicative voltage level V5 between the ground and the voltage supply, as shown in FIG. 8. The output terminal 43 may be connected to a control unit which utilizes these indicative voltage levels V1, V2 and V3 for engine operation controls including fuel injection control.

In this modification, different voltages V4, V5 and V6 appear at the output terminal 43 when the throttle valve 17 occupies predetermined different positions. It is, therefore, possible to determine which one of the predetermined positions the throttle valve 17 occupies by monitoring the voltage produced at a single output terminal. This is effective to provide a compact and inexpensive throttle valve switch unit.

Figure 9:
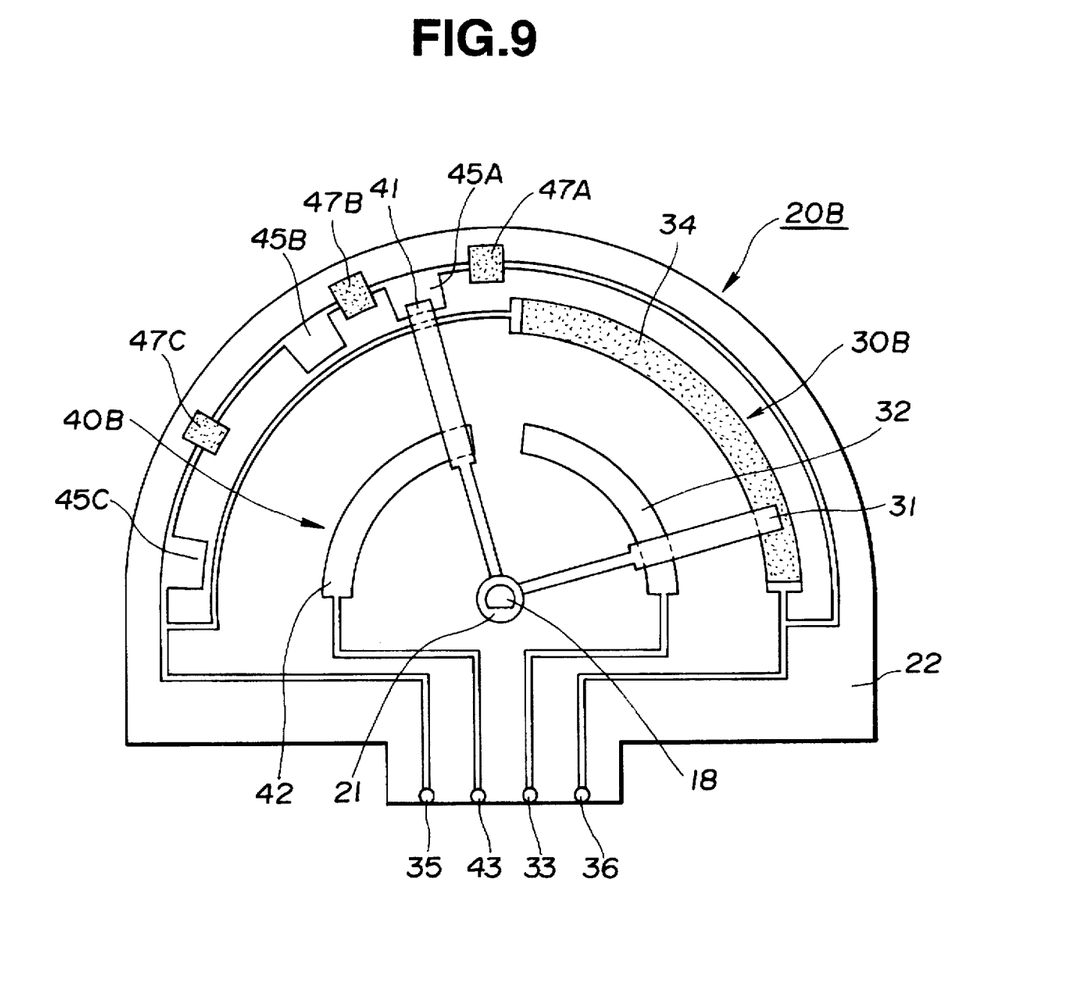
FIG. 9 is an enlarged plan view showing another modified form of the throttle valve switch unit of the invention.
Figure 10:
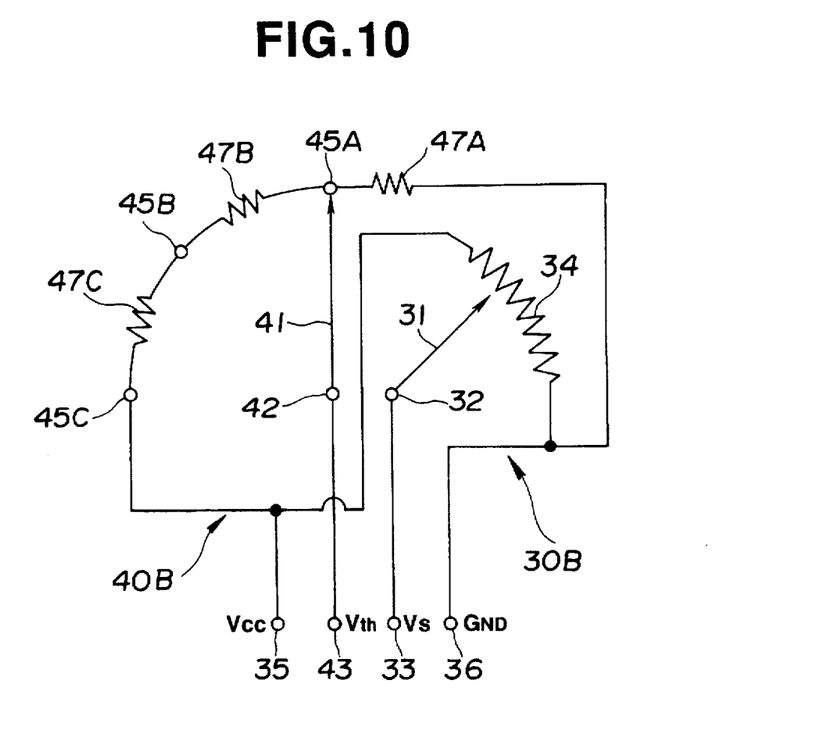
FIG. 10 is a circuit diagram showing an equivalent circuit of the combination of the throttle position sensor and throttle switch included in throttle valve switch unit of FIG. 9.

Referring to FIG. 9, there is shown another modified form of the throttle valve switch unit of the invention. In this modification, the throttle valve switch unit 20B has a throttle position sensor 30B and throttle switch 40B provided on a semi circular shaped insulating substrate 22 made of a non-conductive material. A rotor 21 is suitably fixedly secured to the throttle shaft 18 and supported at the center of the substrate 22 for rotation in unison with the throttle shaft 18. The rotor 21 has two mobile contacts 31 and 41 taken in the form of wiper arms made of a conductive material. The mobile contacts 31 and 41 are formed to make an angle of about 90 degrees and rotated as a unit with rotation of the throttle shaft 18. The substrate 22 has a fixed contact 32 provided thereon. The fixed contact 32 is made of a conductive material and it extends arcuately so as to be engaged by the movable contact 31 throughout the entire range of movement of the mobile contact 31. The fixed contact 32 is connected to an output terminal 33. The substrate 22 also has a resistance element 34 provided thereon. The resistance element 34 extends arcuately outside of the fixed contact 32 so as to be engaged by the movable contact 31 throughout the entire range of movement of the mobile contact 31. For example, the resistance element 34 may be a resistive film printed and sintered on the substrate 22 to have a predetermined resistance. The resistance element 34 is connected at its one end to a terminal 35 for connection to a source of voltage (Vcc) and at the other end thereof to a terminal 36 for connection to the ground (GND). The mobile contact 31, the fixed contact 32 and the resistance element 34 constitute a potentiometer included in the throttle position sensor 30, as best shown in FIG. 10. The resistance of the potentiometer is a function of the extent to which the throttle valve 17 is open. The wiper arm 31 is operatively connected to the throttle valve 17 to change the resistance value of the potentiometer as the throttle valve 17 moves between its fully open and closed positions.

The substrate 22 also has a fixed contact 42 provided thereon. The fixed contact 42 is made of a conductive material and it extends arcuately so as to be engaged by the movable contact 41 throughout the entire range of movement of the mobile contact 41. The fixed contact 42 is connected to an output terminal 43. A plurality of (in the illustrated case three) fixed contacts 45A, 45B and 45C are provided on the substrate 22. The fixed contacts 45A, 45B and 45C are made of a conductive material and they are positioned in an arcuate disposition outside of the fixed contact 42 so that the movable contact 41 can be engaged in succession with the fixed contacts 45A, 45B and 45C. The fixed contact 45A is positioned so as to be engaged by the mobile contact 41 when the throttle valve 17 is at its closed or idle position. The fixed contact 45A is connected to the ground terminal 36 through a resistance element 47A. For example, the resistance element 47A may be a resistive film printed and sintered on the substrate 22 to have a predetermined resistance R1 The fixed contact 45B is positioned so as to be engaged by the mobile contact 41 when the throttle valve 17 is at a correction position, that is, at an angle ranging from 10° to 20°. The fixed contact 45B is connected to the fixed contact 45A through a resistance element 47B. For example, the resistance element 47B may be a resistive film printed and sintered on the substrate 22 to have a predetermined resistance R1. The fixed contact 45C is positioned so as to be engaged by the mobile contact 41 when the throttle valve 17 is at its full or wide open position. The fixed contact 45C is connected at its one end to the fixed contact 45B through a resistance element 47C and at the other end thereof to the terminal 35. For example, the resistance element 47C may be a resistive film printed and sintered on the substrate 22to have a predetermined resistance R1. The mobile contact 41, the fixed contacts 42, 45A, 45B and 45C, and the resistance elements 47A, 47B and 47C constitute the throttle switch 40B. The resistance elements 46A, 46B and 46C are connected in series with each other to establish a voltage divider so that the output terminal 43 is established at a variable voltage level between the ground and the voltage supply, as best shown in FIG. 10. Three different voltage levels appear at the output terminal 43 when the mobile contact 41 engages with the respective fixed contacts 45A, 45B and 45C. Although, in this modification, the resistance elements 46A, 46B and 46C are described as having the same resistance value R1, it is to be understood that they may be selected to have different resistance values to increase the difference between the voltage levels produced for different throttle valve positions.

Figure 11:
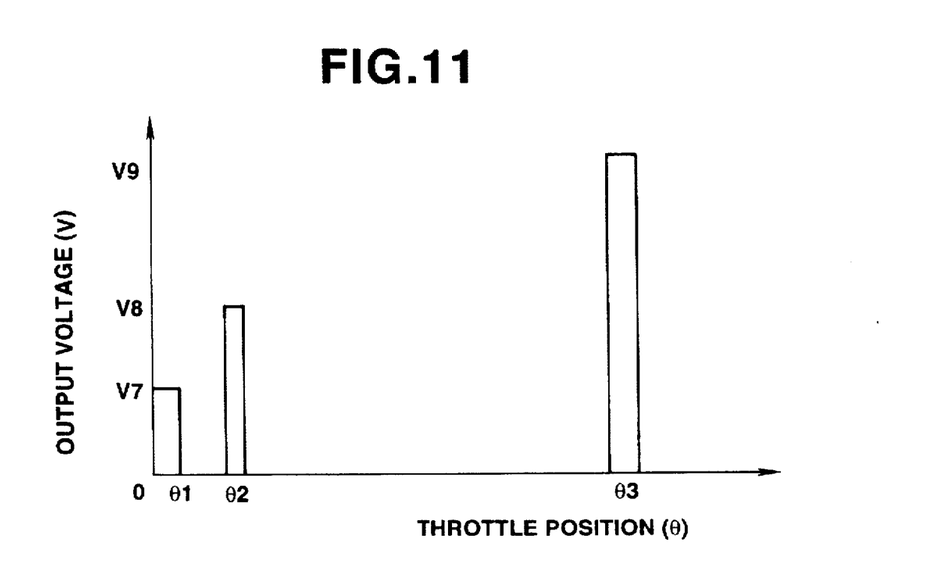
FIG. 11 is a graph used in explaining voltage signals produced at the output terminal of the throttle valve switch unit of FIG. 9.

The operation is as follows: When the throttle valve 17 is at the idle position θ1, the mobile contact 41 engages with the fixed contact 45A, as shown in FIG. 8. As a result, the junction between the resistance elements 47A and 47B is connected through the fixed contact 42 to the output terminal 43. The output terminal 43 is established at an idle position indicative voltage level V7 between the ground and the voltage supply, as shown in FIG. 11. When the throttle valve 17 is at the correction position θ2, the mobile contact 41 engages with the fixed contact 45B. As a result, the junction between the resistance elements 47B and 47C is connected through the fixed contact 42 to the out put terminal 43. The output terminal 43 is established at a correction position indicative voltage level V8 greater than the idle position indicative voltage level V7 between the ground and the voltage supply, as shown in FIG. 11. When the throttle valve 17 is at the wide open position θ3, the mobile contact 41 engages with the fixed contact 45C. As a result, the terminal 35 is connected directly to the output terminal 43. The output terminal 43 is established at a wide open position indicative voltage level V9 substantially equal to the voltage of the voltage source connected to the terminal 35, as shown. in FIG. 11. The output terminal 43 may be connected to a control unit which utilizes these indicative voltage levels V1, V2 and V3 for engine operation controls including fuel injection control.

In this modification, different voltages V7, V8 and V9 appear at the output terminal 43 when the throttle valve 17 occupies predetermined different positions. It is, therefore, possible to determine which one of the predetermined positions the throttle valve 17 occupies by monitoring the voltage produced at a single output terminal. This is effective to provide a compact and inexpensive throttle valve switch unit.

While the invention has been described in connection with a throttle valve switch unit having a throttle position sensor and throttle switch provided as a unit on the same surface of the substrate, it is to be understood that the throttle switch may be provided on the surface opposite to the surface on which the throttle position sensor is provided. This is effective to reduce the size of the substrate. Furthermore, the throttle switch may be provided on a substrate separated from the substrate on which the throttle position sensor is provided. While the invention has been described in connection with three throttle valve positions (idle, correction and wide-open positions), it is to be understood that the number of the throttle valve positions to be determined is not limited to such three positions. While the invention has been described in connection with the single output terminal 43 connected to the mobile contact 41 through, the elongated contact 42, it is to be understood that the output terminal 43 may be connected directly to the mobile contact 41.

What is claimed is:

1. A throttle valve switch unit for use with a throttle valve situated in an internal combustion engine, comprising:

a mobile contact drivingly connected to the throttle valve for movement with rotation of the throttle valve, the mobile contact including a wiper arm;

at least first and second fixed contacts physically separated from each other, the first fixed contact being provided for engagement with a top portion of the wiper arm of the mobile contact when the throttle valve occupies a first predetermined position, the second fixed contact being provided for engagement with the top portion of the wiper arm of the mobile contact when the throttle valve occupies a second predetermined position;

a first terminal for connection to a ground;

a second terminal for connection to a source of voltage;

a first resistance element connected between the first fixed contact and one of the first and second terminals, the first resistance element having a first predetermined resistance value;

a second resistance element connected between the second fixed contact and the one terminal, the second resistance element having a second predetermined resistance value different from the first predetermined resistance value;

a third resistance element connected between the mobile contact and the other terminal; and a signal terminal connected to the mobile contact for producing signals having a first voltage level when the throttle valve occupies the first predetermined position and a second voltage level when the throttle valve occupies the second predetermined position, said second voltage level being different from said first voltage level.

2. The throttle valve switch unit as claimed in claim 1, wherein the first resistance element is connected between the first fixed contact and the first terminal, the second resistance element is connected between the second fixed contact and the first terminal, and the third resistance element is connected between the mobile contact and the second terminal.

3. The throttle valve switch unit as claimed in claim 1, wherein the first resistance element is connected between the first fixed contact and the second terminal, the second resistance element is connected between the second fixed contact and the second terminal, and the third resistance element is connected between the mobile contact and the first terminal.

4. The throttle valve switch unit as claimed in claim 1, wherein the first predetermined position is encountered when the throttle valve is at an idle position and the second predetermined position is encountered when the throttle valve is at a fully open position.

5. The throttle valve switch unit as claimed in claim 4, wherein the first resistance element is connected between the first fixed contact and the first terminal, the second resistance element is connected between the second fixed contact and the first terminal, and the third resistance element is connected between the mobile contact and the second terminal.

6. The throttle valve switch unit as claimed in claim 4, wherein the first resistances element is connected between the first fixed contact and the second terminal, the second resistance element is connected between the second fixed contact and the second terminal, and the third resistance element is connected between the mobile contact and the first terminal.

7. The throttle valve switch unit as claimed in claim 1, wherein the first and second fixed contacts are positioned in an arcuate relationship with respect to each other, wherein the mobile contact moves along an imaginary arc from the first predetermined position in which the throttle valve is in a fully closed state to the second predetermined position in which the throttle valve is in a fully open state, the arcuate relationship being such that when the throttle valve is in the fully closed state corresponding to when the throttle valve is at the first predetermined position, the mobile contact is in direct contact with the first fixed contact, and when the throttle valve is in the fully open state corresponding to when the throttle valve is at the second predetermined position, the mobile contact is in direct contact with the second fixed contact, wherein the throttle valve switch unit is provided on a semi-circular shaped insulating substrate made of a non-conductive material, and wherein the first and second fixed contacts are disposed at an outer periphery of the semi-circular shaped insulating substrate.

8. The throttle valve switch unit as claimed in claim 7, further comprising a third fixed contact being provided for engagement with the mobile contact when the throttle valve occupies a third predetermined position, the third predetermined position corresponding to a partially open state of the throttle valve, wherein the third fixed contact is positioned between the first and second fixed contacts in a same arcuate relationship with the first and second fixed contacts.

9. A throttle valve switch for use with a throttle valve situated in an internal combustion engine, comprising:

a mobile contact drivingly connected to the throttle valve for movement with rotation of the throttle valve, the mobile contact including a first wiper arm and a second wiper arm, the first and second wiser arms being separated from each other by about 90 degrees;

at least first and second fixed contacts physically separated from each other, the first fixed contact being provided for engagement with a top portion of the first wiper arm of the mobile contact when the throttle valve occupies a first predetermined position, the second fixed contact being provided for engagement with the top portion of the first wiper arm of the mobile contact when the throttle valve occupies a second predetermined position;

a first elongated contact provided for engagement with a middle portion of the first wiper arm of the mobile contact throughout an entire range of rotation of the throttle valve;

a second elongated contact provided for engagement with a middle portion of the second wiper arm of the mobile contact throughout the entire range of rotation of the throttle valve;

an elongated resistance element provided for engagement with a top portion of the second wiper arm of the mobile contact throughout the entire range of rotation of the throttle valve, the elongated resistance element extending arcuately outside of the second elongated contact;

a first terminal for connection to a ground, the first terminal being connected to one end of the elongated resistance element by a first lead wire;

a second terminal for connection to a source of voltage, the second terminal being connected to an other end of the elongated resistance element by a second lead wire;

a first non-elongated resistance element connected between the first fixed contact and one of the first and second terminals, the first resistance element having a first predetermined resistance value;

a second non-elongated resistance element connected between the second fixed contact and the one terminal, the second resistance element having a second predetermined resistance value different from the first predetermined resistance value;

a third resistance element connected between the first elongated contact and the other terminal; and a signal terminal connected to the first elongated contact for producing signals having a first voltage level when the throttle valve occupies the first predetermined position and a second voltage level when the throttle valve occupies the second predetermined position, said second voltage level being different from said first voltage level.

10. The throttle valve switch unit as claimed in, claim 9, wherein the first resistance element is connected between the first fixed contact and the first terminal, the second resistance element is connected between the second fixed contact and the first terminal, and the third resistance element is connected between the first elongated contact and the second terminal.

11. The throttle valve switch unit as claimed in claim 9, wherein the first resistance element is connected between the first fixed contact and the second terminal, the second resistance element is connected between the second fixed contact and the second terminal, and the third resistance element is connected between the first elongated contact and the first terminal.

12. The throttle valve switch unit as claimed in claim 9, wherein the first predetermined position is encountered when the throttle valve is at an idle position and the second predetermined position is encountered when the throttle valve is at a fully open position.

13. The throttle valve switch unit as claimed in claim 12, wherein the first resistance element is connected between the first fixed contact and the first terminal, the second resistance element is connected between the second fixed contact and the first terminal, and the third resistance element is connected between the. mobile contact and the second terminal.

14. The throttle valve switch unit as claimed in claim 12, wherein the first resistance element is connected between the first fixed contact and the second terminal, the second resistance element is connected between the second fixed contact and the second terminal, and the third resistance element is connected between the first elongated contact and the first terminal.

15. The throttle valve switch unit as claimed in claim 9, wherein the first and second fixed contacts are positioned in an arcuate relationship with respect to each other outside of the first elongated contact,     wherein the mobile contact moves along an imaginary arc from the first predetermined position in which the throttle valve is in a fully closed state to the second predetermined position in which the throttle valve is in a fully open state, the arcuate relationship being such that when the throttle valve is in the fully closed state corresponding to when the, throttle valve is at the first predetermined position, the mobile contact is in direct contact with the first fixed contact, and when the throttle valve is in the fully open state corresponding to when the throttle valve is at the second predetermined position, the mobile contact is in direct contact with the second fixed contact,     wherein the throttle valve switch unit is provided on a semi-circular shaped insulating substrate made of a non-conductive material,     wherein each of the first and second elongated contacts are elongated arcuately, and     wherein the first and second fixed contacts are disposed at an outer periphery of the semi-circular shaped insulating substrate.

16. The throttle valve switch unit as claimed in claim 15, further comprising a third fixed contact for engaging the mobile contact when the throttle valve occupies a third predetermined position, the third predetermined position corresponding to a partially open state of the throttle valve,     wherein the third fixed contact is positioned between the first and second fixed contacts in a same arcuate relationship with the first and second fixed contacts.

17. A throttle valve switch unit for use with a throttle valve situated in an internal combustion engine, comprising:

a mobile contact drivingly connected to the throttle valve for movement with rotation of the throttle valve the mobile contact including a wiper arm;

at least first and second fixed contacts physically separated from each other, the first fixed contact being provided for engagement with a top portion of the wiper arm of the mobile contact when the throttle valve occupies a first predetermined position, the second fixed contact being provided for engagement with the top portion of the wiper arm of the mobile contact when the throttle valve occupies a second predetermined position;

a first terminal for connection to a ground;

a second terminal for connection to a source of voltage;

first and second resistance elements respectively connected with the first and second fixed contacts to respectively form first and second series circuits, the first series circuit being part of a first plurality of elements that form a first closed circuit connection between the first and second terminals when the wiper arm is in contact with the first fixed contact, the second series circuit being part of a second plurality of elements that form a second closed circuit connection between the first and second terminals when the wiper arm is in contact with the second fixed contact; and     a signal terminal connected to the mobile contact for producing signals having a first voltage level when the throttle valve occupies the first predetermined position and a second voltage level when the throttle valve occupies the second predetermined position, said second voltage level being different from said first voltage level.

18. The throttle valve switch unit as claimed in claim 17, wherein the first predetermined position is encountered when the throttle valve is at an idle position and the second predetermined position is encountered when the throttle valve is at a fully open position.

19. A throttle valve switch for use with a throttle valve situated in an internal combustion engine, comprising:

a mobile contact drivingly connected to the throttle valve for movement with rotation of the throttle valve, the mobile contact including a first wiper arm and a second wiper arm, the first and second wiper arms being separated from each other by about 90 degrees;

at least first and second fixed contacts physically separated from each other, the first fixed contact being provided for engagement with a top portion of the first wiper arm of the mobile contact when the throttle valve occupies a first predetermined position, the second fixed contact being provided for engagement with the top portion of the first wiper arm of the mobile contact when the throttle valve occupies a second predetermined position;

a first elongated contact provided for engagement with a middle portion of the first wiper arm of the mobile contact throughout an entire range of rotation of the throttle valve;

a second elongated contact provided for engagement with a middle portion of the second wiper arm of the mobile contact throughout the entire range of rotation of the throttle valve;

an elongated resistance element provided for engagement with a top portion of the second wiper arm of the mobile contact throughout the entire range of rotation of the throttle valve, the elongated resistance element extending arcuately outside of the second elongated contact;

a first terminal for connection to a ground the first terminal being connected to one end of the elongated resistance element by a first lead wire;

a second terminal for connection to a source of voltage, the second terminal being connected to an other end of the elongated resistance element by a second lead wire;

first and second non-elongated resistance elements respectively connected with the first and second fixed contacts to respectively form first and second series circuits, the first series circuit being part of a first plurality of elements that form a first closed circuit connection between the first and second terminals when the first wiper arm is in contact with the first fixed contact, the second series circuit being part of a second plurality of elements that form a second closed circuit connection between the first and second terminals when the first wiper arm is in contact with the second fixed contact; and     a signal terminal connected to the first elongated contact for producing signals having a first voltage level when the throttle valve occupies the first predetermined position and a second voltage level when the throttle valve occupies the second predetermined position said second voltage level being different from said first voltage level.

20. The throttle valve switch unit as claimed in claim 19, wherein the first, predetermined position is, encountered when the throttle valve is at an idle position and the second predetermined position is encountered when the throttle valve is at a fully open position.

\* \* \* \* \*